United States Patent
Placido Neto et al.

(10) Patent No.: US 12,512,657 B2
(45) Date of Patent: Dec. 30, 2025

(54) AUTONOMOUS METHOD TO PREVENT BROWNOUT OF SUBSEA ELECTRONIC MODULES

(71) Applicant: Robert Bosch GmbH, Stuttgart (DE)

(72) Inventors: Amadeu Placido Neto, Aschaffenburg (DE); Alexandre Orth, Hettstadt (DE); Stein Berg Nilsen, Ski (NO)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 18/556,907

(22) PCT Filed: Apr. 25, 2022

(86) PCT No.: PCT/EP2022/060798
§ 371 (c)(1),
(2) Date: Oct. 24, 2023

(87) PCT Pub. No.: WO2022/233613
PCT Pub. Date: Nov. 10, 2022

(65) Prior Publication Data
US 2024/0213759 A1     Jun. 27, 2024

(30) Foreign Application Priority Data
May 4, 2021   (EP) ..................................... 21172005

(51) Int. Cl.
*H02H 3/00*     (2006.01)
*H02H 3/04*     (2006.01)
*H02J 3/14*     (2006.01)

(52) U.S. Cl.
CPC ................. *H02H 3/04* (2013.01); *H02J 3/14* (2013.01)

(58) Field of Classification Search
None
See application file for complete search history.

(56) References Cited

U.S. PATENT DOCUMENTS 9,859,805 B2 *   1/2018  Thibaut ..................... H02J 4/00
10,873,185 B2 * 12/2020  Di Maio .................. H02J 9/06
(Continued)

OTHER PUBLICATIONS

International Search Report corresponding to PCT Application No. PCT/EP2022/060798, mailed Aug. 19, 2022 (English language document) (3 pages).

*Primary Examiner* — Stephen W Jackson
(74) *Attorney, Agent, or Firm* — Maginot, Moore & Beck LLP

(57) ABSTRACT

A method is for controlling a subsea system including at least one slave subsea electronic module installed in a subsea device, to prevent brownout of the subsea system. The system includes a master subsea electronic module, configured to provide power to the at least one slave subsea electronic module. The subsea device is configured to execute several operations. The method includes measuring the voltage or the current provided from the subsea electronic module to the slave subsea electronic module, and comparing the measured voltage or current value with a threshold value. When the measured voltage is lower than the threshold value or the measured current is higher than the threshold value, the method powers off or limits a power of at least one of several components of the subsea device which is used to execute one of the several operations using the slave subsea electronic module.

11 Claims, 3 Drawing Sheets

(56) References Cited

U.S. PATENT DOCUMENTS

| | | |
|---|---|---|
| 2010/0244563 A1 | 9/2010 | Fleck |
| 2011/0247825 A1 | 10/2011 | Batho et al. |
| 2015/0036256 A1* | 2/2015 | Baker .................. H02J 4/00 361/191 |
| 2015/0123464 A1 | 5/2015 | Hess |
| 2019/0319457 A1 | 10/2019 | Di Maio et al. |

* cited by examiner

AUTONOMOUS METHOD TO PREVENT BROWNOUT OF SUBSEA ELECTRONIC MODULES

This application is a 35 U.S.C. § 371 National Stage Application of PCT/EP2022/060798, filed on Apr. 25, 2022, which claims the benefit of priority to Serial No. EP 21172005.7, filed on May 4, 2021 in Europe, the disclosures of which are incorporated herein by reference in their entirety.

The disclosure relates to a method for preventing a brownout of a subsea system comprising one or more subsea devices each comprising a subsea electronic module.

BACKGROUND

The state-of-the-art of subsea production systems include, for instance, subsea valve actuators (SVA) with an all-electric interface. These actuators require a master subsea electronic module (SEM) to provide power and communication relayed from the operator on the topside. The operator sends high-level commands, which are relayed through the master SEM to a slave SEM embedded in the actuator itself. The slave SEM proceeds to translate these high-level commands into a sequence of low-level operations. Depending on the type of actuator, these low-level operations may include for example: controlling electric motor drivers; switching directional control valves; switching electromechanical latches; measuring process variables (position, torque, etc. . . . ) via sensors; recharging internal battery packs; switching internal power supply of electric peripheral devices, etc.

Depending on the features of the actuator, these operations may also be executed autonomously, without a prompt from the operator.

In order to reduce the cost and complexity of the system, the actuators may be powered with an instrumentation electric supply, as defined by the SIIS standard. To reduce the infrastructure costs even further, multiple actuators are normally connected in a star topology in a similar fashion as shown in FIG. 1. This array reduces the amount of subsea cables and connectors required to interface the actuators with the SEM.

However, due to a limitation in the power output available for the actuators, the operator may command—accidentally or unknowingly—the actuators to activate simultaneously, drawing more electric power from the power supply than it is available. This may then cause a brownout, dropping the supplied electric voltage to all actuators in the network. If this happens, the actuators may unexpectedly shutdown, causing an unwanted disruption in the production.

One way to prevent this is to use the SEM as a centralized observer, to monitor actively all actuators in the network and to relay the commands selectively according to the current power available in the network. This requires a highly customizable application on the SEM, which must be configured ad hoc, according to the topology and the types of the actuators in the network.

A less complex alternative can be partially shift the responsibility to the operator to act on-the-fly, while ensuring the actuators never overload the available power supply without any feedback from the actuator.

However, both solutions for preventing brownout do not provide a reliable system, which is at the same time compact and not too complex.

Therefore, scope of the disclosure is to provide a method to prevent brownout, which overcomes the mentioned drawbacks.

SUMMARY

The disclosure is based on the idea of an embedded system that constantly monitors the voltage supply of the slave electronic modules.

According to an embodiment of the disclosure, a method for controlling a subsea system so as to prevent brownout of the subsea system is provided. The subsea system comprises at least one slave subsea electronic module installed in a subsea device, wherein said subsea system (100) further comprises a master subsea electronic module, which is configured to provide power to the at least one slave subsea electronic module, wherein said subsea device is configured to execute a plurality of operations. The method comprising the following steps:
 a. Measuring the voltage or the current provided from said master subsea electronic module to said slave subsea electronic module;
 b. Comparing the measured voltage value or the measured current value with a threshold value;
 c. If the measured voltage is lower than the threshold value or if the measured current is higher than the threshold value, starting to power off or to limit the power of at least one of a plurality of components of the subsea device which is used to execute one of the plurality of operations by means of said slave subsea electronic module.

BRIEF DESCRIPTION OF THE DRAWINGS

The disclosure is described with reference to the enclosed figures wherein the same reference numbers refer to the same parts and/or to similar parts and/or to corresponding parts of the system. In the figures.

DETAILED DESCRIPTION

In the following, the disclosure is described with reference to particular embodiments as shown in the enclosed figures. Nevertheless, the disclosure is not limited to the particular embodiments described in the following detailed description and shown in the figures, but rather the embodiments described simply exemplify several aspects of the disclosure, the scope of which is defined by the claims.

Further modifications and variations of the disclosure will be clear for the person skilled in the art. The present description is thus to be considered as including all said modifications and/or variations of the disclosure, the scope of which is defined by the claims.

According to an embodiment of the disclosure, a method for controlling a slave subsea electronic module is provided. In the prosecution of the disclosure, the slave subsea electronic module is installed in a subsea actuator. However, it is clear for the skilled person that this is just an example and that the disclosure can be applied to many different types of subsea devices containing a slave subsea electronic module.

Figure 1:
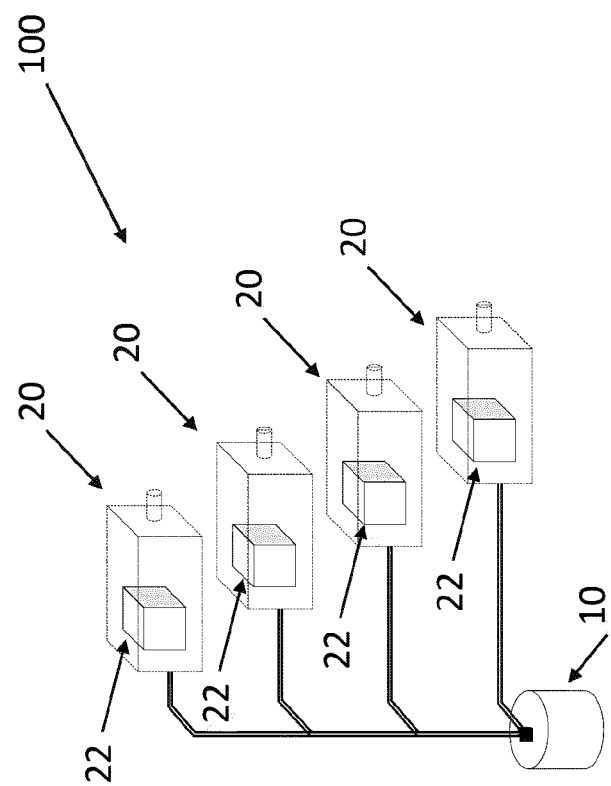
FIG. 1 schematically shows subsea valve actuators connected with a master subsea electronic module.

According to the embodiment described in FIG. 1 the actuators are connected in a star topology or in a bus topology. However, it is clear for the skilled person in the art that this disclosure can also work with a single actuator and it is not necessary to provide more actuators.

As shown in FIG. 1 the subsea system 100 comprises a master subsea electronic module 10 to which a plurality of subsea valve actuators 20 are connected. The master subsea electronic module 10 is configured to provide power and communication relayed from an operator on the topside to the subsea valve actuators 20 at an electrical interface of each actuators 20. Each of the actuators is provided with a slave subsea electronic module 22, which is embedded in the actuator itself. The slave subsea electronic module is configured to translate high-level commands into a sequence of low-level operations.

Depending on the type of actuator, these low-level operations may include: controlling electric motor drivers; frequency inverters; switching directional control valves; switching electromechanical latches and relays; measuring process variables (position, torque, etc. . . . ) via electronic sensors; recharging internal battery packs and switching internal power supply of electric peripheral devices. Depending on the features of the actuator, these operations may also be executed autonomously, without a prompt from the operator.

The disclosure comprises an embedded system installed in each of the actuators (or any subsea device with a slave subsea electronic module) that constantly monitors the voltage supply (or alternative the current) of each of the device. The voltage supply measurement can be adequately conditioned, for example filtered in order to eliminate fluctuations or ripples, which are not caused by a brownout. The filter can be represented by a standard filter known from the state of the art or can be represented by a filter integrated in a software used in the actuator. As soon as the voltage drops below a certain threshold value (ripple threshold), the method considers that brownout is started. Therefore, the system then interrupts its present actions and initiates a sequence to power off or to reduce the power consumption of the electric components in the device. The aim is to prevent the brownout from shutting down the slave subsea electronic module and potentially the valve actuator or the subsea device as well.

The threshold value is a value for the voltage that is lower than the nominal but still sufficient to provide power to the device and its peripherals.

Alternative the same method can be applied by measuring the current drawn from the device and to judge if a threshold value (maximum current threshold) for the current has been reached: in that case, the system interrupts its present actions and initiates a sequence to power off or to reduce the power consumption of the electric components in the device.

The order of electric components that are de-energized is prioritized in a manner to have the minimum impact possible on the actual operational state of the device. An example of the voltage/current profile and the signal that trips this system is shown in FIG. 2.

Figure 2:
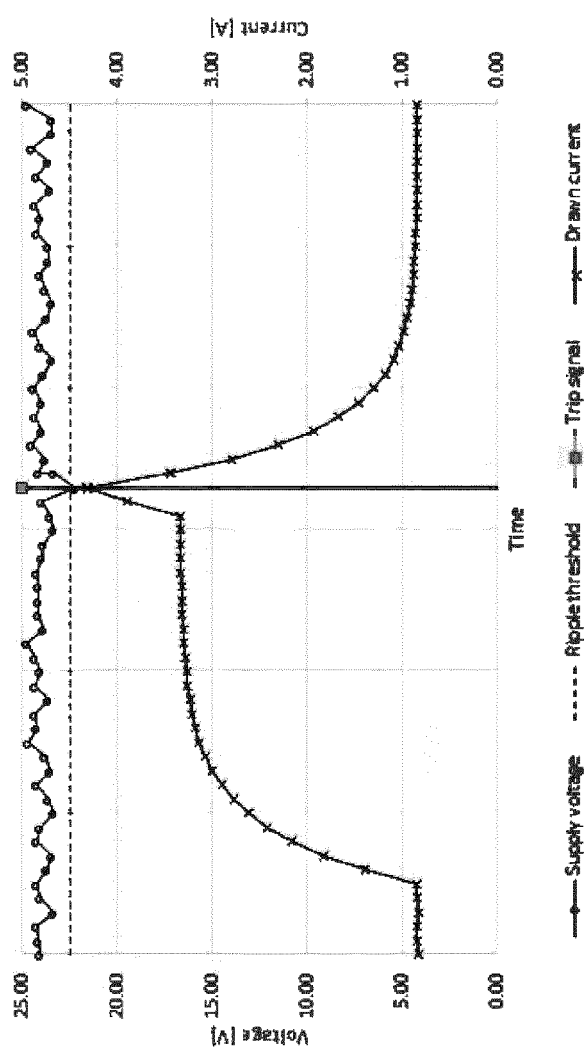
FIG. 2 an example of one actuator detecting a brownout starting due to its own action and subsequently preventing it according to a preferred embodiment of the disclosure.

As shown in FIG. 2, as soon as the detected voltage drops below a ripple threshold (which in this case is a value between 20 and 25 V) or the current overcomes a ripple threshold (which in this case is a value comprised between 4 and 5 A), a trip signal is provided by the actuator or device, and particularly by the slave subsea electronic module inside the device, which causes some of the operations provided by the device to stop. In this particular configuration, in which the actuators do not communicate to each other, these shut down operations are repeated in each of the actuators shown in FIG. 1.

Figure 3:
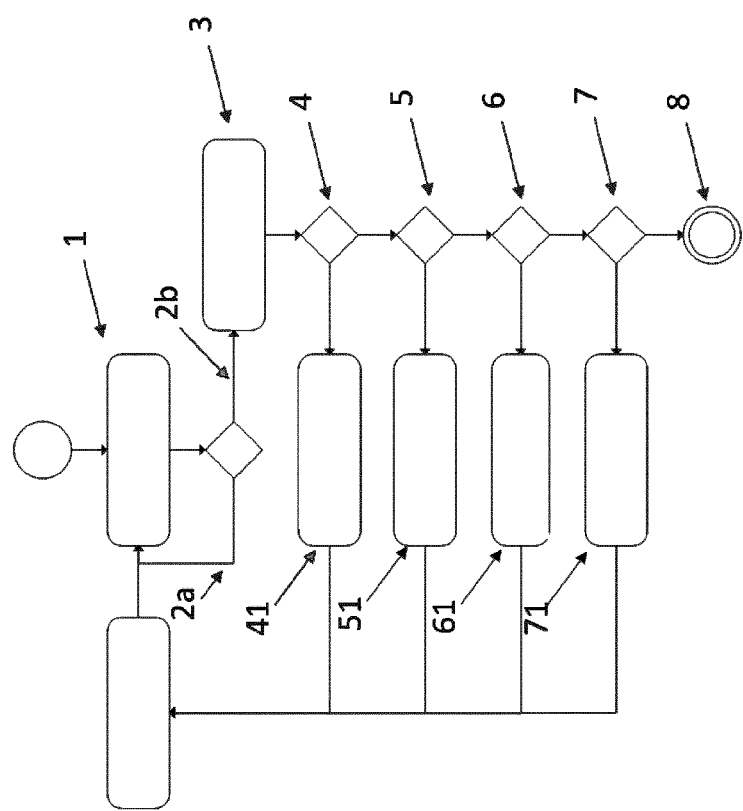
FIG. 3 shows an example of the logic sequence for brownout prevention in a subsea valve actuator according to a preferred embodiment of the disclosure.

FIG. 3 shows in detail an example of how such a process is executed in each of the actuators 20 of FIG. 1.

In the first step 1 the voltage received at the interface of the actuator 20 is monitored by the slave subsea electronic module 22 and in step 2 it is controlled if the measured voltage (which has been preferably adequately conditioned before) is lower or higher with respect to the ripple threshold. If the voltage is higher 2a than the ripple threshold, the voltage is measured again.

In case the voltage is lower 2b that the predetermined value, at least one present action of the actuator has to be interrupted 3 in order to prevent brownout from occurring. For this scope, a list of low level operations is provided to each actuator with a predetermined priority.

In the example represented in FIG. 3 the following prioritizations has been assigned to the actuator: the first operation that is controlled is if the electric drive is active, the second operation that is controlled if the line relief valves are active, the third operation that is controlled is if the condition monitoring is active and the fourth operation that is controlled is if the safety valves are active. The first operation that is controlled is the one with lower priority and the last one is the one with the highest priority, since, as will be clearly explained in the prosecution of the description, it is the last action that it will be shut down.

It is clear for the skilled person in the art that a different order of prioritization of the operations can be assigned to the actuator and that additional operations actions can be powered off or some of the listed actions can be omitted from the control.

Therefore, in the example shown in FIG. 3, if it is judged that the supplied voltage dropped below the ripple threshold, it is then evaluated if the electric drive is active. If this is the case, in the step 41 the electric drive is powered off and the logic returns to step 1 and the voltage is monitored again.

If the voltage is still lower than the ripple threshold or if in step 4 it has been judged that the electric drive was inactive, the logic prosecute to step 5 where it is evaluated if the line relief valves are active. The steps are analogous to the ones described for the step 4: if the line relief valves are active, the line relief valves are powered off 51 and the logic returns to step 1.

If the voltage is still lower than the ripple threshold or if in step 5 it has been judged that the line relief valves were inactive, the logic prosecute to step 6 where it is evaluated if the condition monitoring is active. The steps are analogous to the ones described for the steps 4 and 5: if the condition monitoring is active, the condition monitoring is powered off 61 and the logic returns to step 1.

If the voltage is still lower than the ripple threshold or if in step 6 it has been judged that the condition monitoring was inactive, the logic prosecute to step 7 where it is evaluated if the safety valves are active. The steps are analogous to the ones described for the steps 4, 5 and 6: if the safety valves are active, the safety valves are powered off 71 and the logic goes to step 1, where it is checked again if the voltage is still lower than the ripple threshold.

If the voltage is still lower than the ripple threshold or if in step 7 it has been judged that the line safety valves were inactive, the logic prosecute to step 8, where it is detected by the actuator that all the systems of the actuator are off.

Optionally between any of steps 41, 51, 61, 71, a notification of brownout detection is delivered to an operator.

Alternatively, the operator can be informed that a brownout has been effectively prevented if after any of the steps 41, 51, 61 or 71 it has been detected that the pressure is higher that the ripple threshold.

This system must execute these actions faster than the dynamic response of the power supply requires reaching the low voltage supply limit. This period will depend of the power supply characteristics and the electrical current being drawn. However, it depends also on the voltage monitoring system and the processing speed of the logic unit.

Physically, the disclosure is comprised of a programmable logic unit that controls the electric peripherals in the actuator and a power supply monitoring system able to monitor the instantaneous supply voltage and the instantaneous electrical current consumption. In addition, the disclosure includes a logic sequence that dictates the order of deactivation of the electric components in the actuator.

While the disclosure has been described with reference to the embodiments described above, it is clear for the skilled person that it is possible to realize several modifications, variations and improvements of the present disclosure in the light of the teaching described above and within the ambit of the enclosed claims without departing from the spirit and the scope of protection of the disclosure.

In addition, those areas in which it is believed that those of ordinary skill in the art are familiar, have not been described herein in order not to unnecessarily obscure the disclosure described.

Furthermore, even if in the description a star topology has been described, it is clear for the skilled person in the art that this disclosure can be applied to all topologies with parallel connections like bus, star, mesh and so on.

Additionally, even if the disclosure has been described with reference to the particular example described in FIG. 3, it is clear that this disclosure can be also used with a different sequence of powering off or of limiting the power of the low-level operations described.

Furthermore, even if the disclosure has been described with reference to FIG. 1, in which a plurality of actuators has been described, it is clear to the skilled person in the art that this disclosure can be also applied to any type of subsea devices with a slave electronic module, like a subsea sensor, a compressor, a pump and so on. This disclosure can be also applied to a combination of different type of subsea devices.

Accordingly, the disclosure is not to be limited by the specific illustrative embodiments, but only by the scope of the appended claims.

The invention claimed is:

1. A method for controlling a subsea system so as to prevent a brownout of said subsea system, said subsea system comprising a master subsea electronic module configured to provide power to a plurality of subsea devices each including a slave subsea electronic module operably connected to a component, said plurality of subsea devices configured to execute a plurality of operations; the method comprising:
   a. measuring a corresponding voltage value or a corresponding current value provided from each of said slave subsea electronic modules to a corresponding component included in a plurality of components;
   b. comparing each of the measured corresponding voltage values to a threshold voltage value, or comparing each of the corresponding measured current values with a threshold current value; and
   c. when one of the measured corresponding voltage values is lower than the threshold value or when one of the measured corresponding current values is higher than the threshold current value, powering off or limiting power of at least one component of the plurality of components using said at least one slave subsea electronic module operably connected to the at least one component, the at least one component configured to execute an operation of the plurality of operations.

2. The method according to claim 1, wherein during step c. the components are selectively powered off or power limited with a predetermined order.

3. The method according to claim 1, wherein:
   the subsea system comprises a plurality of said subsea devices,
   said subsea devices do not communicate with each other, and
   steps a to c are repeated for each of said subsea devices independently.

4. The method according to claim 1, wherein during step a each of the measured corresponding voltage values is conditioned or each of the measured corresponding current values is conditioned.

5. The method according to claim 1, wherein:
   when in step c. it is determined that the measured corresponding voltage is lower than the threshold voltage value or that the measured corresponding current is higher than the threshold current value, said steps a. to c. are repeated until it is determined that a predetermined condition has been reached, and
   for each sequence of steps a. to c. a different component of the plurality of components is powered off using said at least one slave subsea electronic module operably connected to the different component.

6. The method according to claim 5, wherein said predetermined condition is a predetermined value of voltage or a predetermined value of current, which is provided to said subsea device.

7. The method according to claim 1, wherein the subsea system notifies an operator when the brownout has been effectively prevented.

8. The method according to claim 1, wherein said subsea device is a subsea actuator.

9. The method according to claim 1, wherein a programmable logic unit is programmed to execute the method.

10. The method according to claim 1, wherein a power supply monitoring system for the subsea system is configured to execute the method.

11. The method according to claim 1, wherein the at least one component that is powered off or limited in power is different from a component of the plurality of components that resulted in the measured corresponding voltage value that is lower than the threshold voltage value or the measured corresponding current value that is higher than the threshold current value.

* * * * *